United States Patent [19]
Westlake et al.

[11] 3,733,164
[45] May 15, 1973

[54] POROUS MEDIA TUNNEL BURNER

[75] Inventors: Donald Westlake, Fleet; Kenneth F. Coles, Farnborough, both of England

[73] Assignee: Shell Oil Company, New York, N.Y.

[22] Filed: July 9, 1971

[21] Appl. No.: 161,109

[30] Foreign Application Priority Data

July 13, 1970 Great Britain.....................33,835/70

[52] U.S. Cl..............................................431/328
[51] Int. Cl..............................................F23d 13/12
[58] Field of Search...........................431/158, 328

[56] References Cited
UNITED STATES PATENTS

| | | | |
|---|---|---|---|
| 3,191,659 | 6/1965 | Weiss | 431/328 |
| 3,119,439 | 1/1964 | Weiss | 431/328 |
| 3,425,675 | 2/1969 | Twine | 431/328 |
| 1,223,308 | 4/1917 | Bone et al. | 431/328 |
| 3,208,247 | 9/1965 | Weil et al. | 431/328 |

Primary Examiner—Carroll B. Dority, Jr.
Attorney—Harold L. Denkler et al.

[57] ABSTRACT

A porous media burner comprises an outer casing of impermeable material separated by a gas distributing space from an inner hollow core, open at one end, of a porous medium. The fuel mixture enters the gas distributing space between the casing and the core and then passes through the core to the hollow space of the core.

8 Claims, 3 Drawing Figures

PATENTED MAY 15 1973 3,733,164
FIG. 1
FIG. 2
FIG. 3
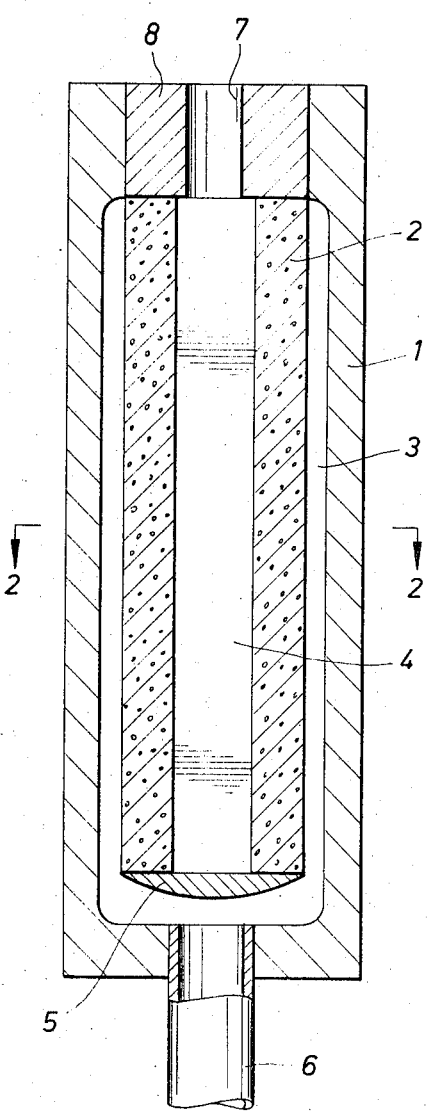
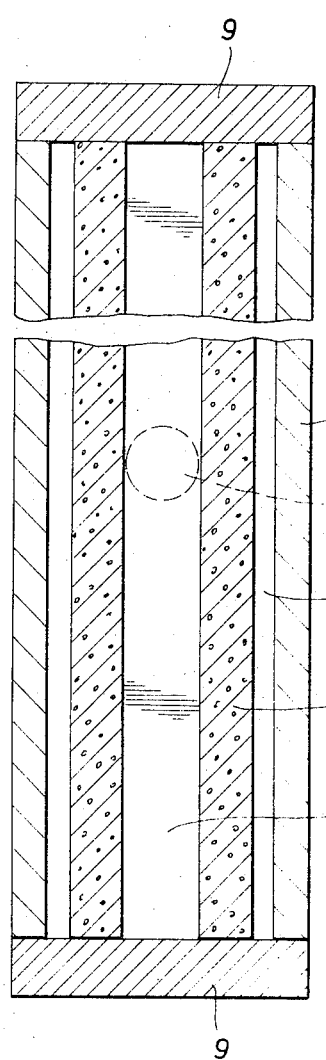
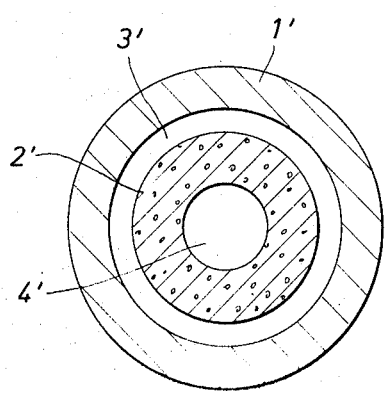
Donald Westlake
Kenneth F. Coles
INVENTORS

POROUS MEDIA TUNNEL BURNER

BACKGROUND OF THE INVENTION

1. Field of the Invention

The invention relates to the field of burners and, more particularly, to a tunnel burner with a porous media stabilizer for use in heating appliances.

2. Description of the Prior Art

Porous media burners are suitable for a large variety of applications in the heat treatment, drying and processing field, such as ceramics, domestic heating and cooking, road heating, chemicals processing, textiles, paints, foods, paper, ferrous and non-ferrous metals, glasses, refractory materials, cement and lime.

In porous media combustion systems an unburnt gaseous fuel-oxidant mixture is fed to the upstream side of a porous solid and combustion or reaction takes place near the downstream surface. A variety of porous structures and solid materials offers a variety of reaction zones: combustion may take place in the gas phase above the porous media, inside the pores themselves or on the pore surface within a porous medium (which may or may not be catalytic).

Heat-treating processes continue to need faster heating rates and precision in heat application; such requirements can be met by taking advantage of the high heat transfer flux which is potentially available from a high temperature high velocity gas stream.

In this connection porous media combustion systems may be suitably used because of the possibility of high heat transfer rates, silent operation and clean combustion over a range of gas/oxidant ratios.

SUMMARY OF THE INVENTION

Applicant has found a porous media stabilizer which is able to withstand severe operation conditions and to fulfill high requirements concerning temperature distribution and the predetermined control thereof and which is particularly suitable for incorporation in a high intensity tunnel burner.

According to the invention a porous media tunnel burner comprises a closed outer casing of impermeable material and connected therewith an inner hollow core of a porous medium open at one end. The inner core is spaced from the outer casing whereby a gas distributing space is formed between the casing and the core. This space is in communication with an inlet in the casing for a combustible gas mixture. The arrangement is such that the mixture can pass through the core from the gas distributing space to the hollow space of the core.

A main advantage of the burner according to the invention is that during operation this burner is self-cooling because heat which tends to leak through the porous core is met by the incoming cold gas stream which in turn is preheated. The casing consequently is a cold wall and no external cooling is required.

Further, the porous core presents an inlet port area uniformly spread over substantially the whole of the hollow space of the core which may constitute the combustion space. This large exit surface area results in a low pressure drop across the core and a laminar exit of the gas from the pores of the core. This produces a stabilizing effect, whilst a high combustion intensity is obtained per unit of surface volume of the combustion space. As a consequence thereof, for a given output a lower mixture pressure is required than in conventional high intensity burners and a smaller combustion space is needed than that of the conventional high intensity burners.

Moreover, the noise level is relatively low and the stable combustion causes no undesirable vibration.

According to the invention in a particular embodiment, in a porous media burner the casing and the hollow core are cylindrical and coaxial, the core being connected to the casing at or near its open end, a central axial inlet being provided in the casing at the end facing the closed end of the hollow core.

This very compact burner can easily be installed in ovens or like combustion appliances, whilst the central inlet of the mixture ensures an even distribution over the symmetrical annular gas distributing space.

Although the burner can be made of any material having a suitably low thermal conductivity the use of a refractory material can be very attractive. According to a preferred embodiment of the invention the casing and the core are made of different gradings of a high alumina or stabilized zirconia aggregate. The casing and the core part can be connected by sintering. The casing and the core part may consist of the same composition or at least compatible compositions.

The alumina is shock-resistant and withstands high temperatures, is erosion-resistant and is of such a mechanical strength that during severe operating conditions no damage of the elements is to be feared. A method of manufacturing such ceramic elements of different porosity comprises the steps of separating a refractory capable of being sintered into a plurality of grain size gradings by sieving, casting a permeable core from one or more gradings of refractory with a predetermined quantity of cement and water in a frame-type mould, allowing the core to be air-cured, sintering the core by heat treatment, cooling the sintered core, casting a substantially non-permeable refractory casing in a mould around the core from a dense grading of the refractory with cement and water and allowing it to be air-cured, sintering the casing around the core by heat treatment and cooling the so formed porous ceramic element.

Such elements having a core of relatively high permeability, laterally surrounded by a layer of substantially no permeability being the same material but of different grain size grading than the core, offer the advantage of being substantially free from lateral leakage and able to withstand thermal stresses. Moreover, the problems in connection with metal casings, which gave rise to operational troubles in conventional radiant heating appliances, are avoided. A major advantage is that complete predetermined control of combustion is possible by proper selection of the grain size gradings.

The heat treatment of the complete element may be carried out during about 12 hours including a soaking period up to 3 hours at a temperature of about 1,600°C. In the step comprising the manufacture of the porous core the temperature is, preferably, about 1,700°C, which is maintained during a period of up to 4 hours.

The separation of the basic material into different gradings may be effected by passing it through successive sieves of ranges of 10–18, 18–25, 25–36 British Standard Sieve, respectively; also gradings of a wider range may be used, i.e., the range of 18–36 British Standard Sieve.

The basic material for the core part may also be of finer gradings than indicated above; gradings of a fineness approaching the powdery state may be applied. When manufacturing blocks wherein very fine gradings for the basic material in the core part are used, it is advisable to add together with the cement supplementary material to the core which during sintering will be burnt out, so as to ensure a satisfactory permeability of the core part.

The alumina cement preferably comprises refractory passing through a 200 mesh B.S. sieve and then mixed up with about 5 percent water for use as a bonding material in the manufacture of the elements. The cast material will then be air-cured during a period of at least 20 hours.

BRIEF DESCRIPTION OF THE DRAWINGS

FIG. 1 is a horizontal section of a burner according to the invention.

FIG. 2 is a vertical section along the line 2—2 of FIG. 1 of an embodiment of the burner of this invention which is rectangular in vertical section.

FIG. 3 is a view similar to that of FIG. 2 of an alternative cylindrical embodiment of the burner of this invention which is circular in vertical section.

DESCRIPTION OF A PREFERRED EMBODIMENT

In the drawings 1 designates a burner casing of impermeable refractory material provided with a core 2 made of a porous refractory material. A gas-distributing space 3 is present between the casing 1 and the core 2 and extends over substantially the complete outer surface of the core 2, which is a hollow body provided with a central combustion space 4. The core 2 is closed at one end by a seal cover 5. The distribution space 3 is in communication with an inlet port 6 in the casing 5 for the supply of a combustible mixture. The combustion space 4 opens at the end opposite the seal cover 5, into an outlet port 7 provided within nozzle part 8.

In FIG. 2 an embodiment having the shape of a rectangular prism is shown, wherein the casing is laterally closed by end covers 9.

In FIG. 3 a cylindrical embodiment is shown, the distributing space being in the form of an annular gap 3' between a cylindrical outer casing 1' and cylindrical inner core 2'.

In operation the fuel (e.g., natural gas or LPG) - air or oxidant mixture enters the inlet pipe 6 at the rear of the burner and passes down the gap 3 between the outer body and inner body (the casing 1 and the core 2, respectively) and then through the porous medium. Combustion takes place near the inner surface of the porous medium; the combustion gases pass out through the outlet 7 of nozzle portion 8.

In the embodiment of FIG. 2, as an alternative the casing also may be made of one piece instead of being provided with end covers 9. Also a plurality of inlet pipes 6 may be provided, distributed over the length of the burner.

In both embodiments, as a further alternative a separate nozzle part 8, which e.g., is made of zirconia, is not a strict necessity, as this part may also be formed as an integral part of the casing or by extending the core 2 till the end outlet face of the burner. The outlet 7 may also be of the same width (or diameter) as the combustion space 4 and both may be either circular or rectangular. Further, instead of closing the end of the core 2 by a seal cover 5, the core may be one piece, the outer wall at the closed end thereof then may be streamlined and have a somewhat greater wall thickness than the remaining part of the core. The usual wall thickness of the core, depending on the design and capacity of the burner, preferably is between $1/r$ inch (6mm) and 2 inches (50 mm).

The burner is suitable for operation stoichimetric mixtures as well as with non-stoichiometric mixtures, such as by partial combustion for creating a reducing gas, but also for creating oxidizing atmospheres, by operating with a surplus of oxidant.

The burner according to the invention is particularly suitable for use as a tunnel burner and fulfils immediate requirements in the rapid heating of metal field for a high velocity, high mass throughput burner (e.g., 100 kg/h fuel). However, the burner structure according to the invention can be designed to produce any shape or size of high intensity burner.

We claim as our invention:

1. A porous media burner comprising:
   an impermeable casing having inlet and outlet ports therein;
   a hollow core having a wall composed of a permeable, porous medium connected to the casing, the hollow core having an opening therein and being positioned within the casing with the opening in communication with the outlet port of the casing;
   the casing and the hollow core being composed of a refractory material of substantially the same composition;
   the hollow core being spaced from the casing about a substantial portion of the outer surface area of the core whereby a gas distributing space is defined between the hollow core and the casing;
   the gas distributing space being in communication with the inlet port of the casing;
   whereby a combustible gas mixture may flow through the inlet port into the gas distributing space, pass through the permeable wall of the hollow core from the gas distributing space to the hollow space of the core, and then exit from the casing through the outlet port.

2. The porous media burner of claim 1 wherein the casing and the hollow core are cylindrical and coaxial, the opening in the core and the outlet port of the casing being adjacent one end of the cylindrical casing and the inlet port being adjacent the opposite end of the cylindrical casing.

3. The porous media burner of claim 1, wherein the refractory material of the casing and core, respectively, comprises first and second gradings of a high alumina aggregate, the first grading being more dense than the second.

4. The porous media burner of claim 1, wherein the refractory material of the casing and core, respectively, comprises first and second gradings of zirconia-based aggregates, the first grading being more dense than the second.

5. The porous media burner of claim 1 wherein the casing and the core are connected by sintering.

6. The porous media burner of claim 1 wherein the wall thickness of the hollow core is between one-fourth inch and 2 inches.

7. The porous media burner of claim 1 including a nozzle part positioned in the outlet port of the casing in communication with the opening in the hollow core.

8. The porous media burner of claim 7 wherein the nozzle part consists of a zirconia aggregate and the casing and core consists of a alumina aggregate.

* * * * *